Figure 1:
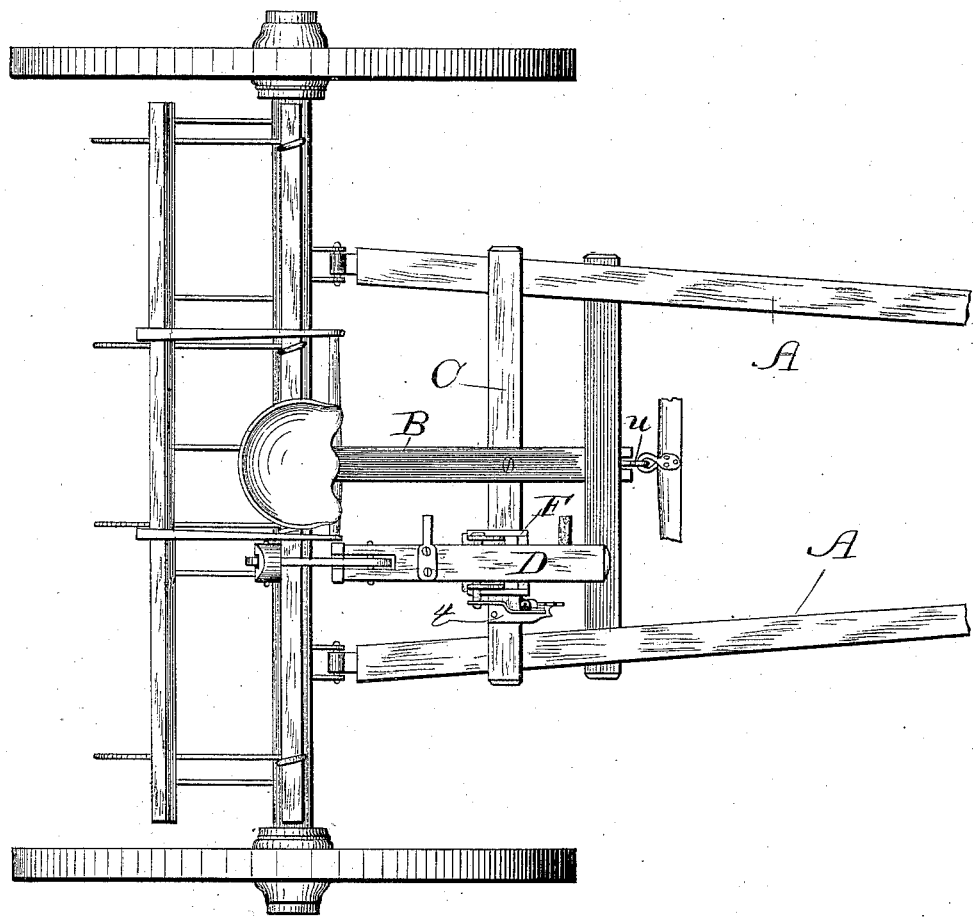

(No Model.)

2 Sheets—Sheet 1.

C. A. WERDEN.
HORSE HAY RAKE.

No. 316,706. Patented Apr. 28, 1885.

Witnesses:
C. E. Gaylord.

Inventor:
Cyrus A. Werden,
by P. C. Dyrenforth,
his Attorney.

(No Model.) 2 Sheets—Sheet 2.
C. A. WERDEN.
HORSE HAY RAKE.
No. 316,706. Patented Apr. 28, 1885.
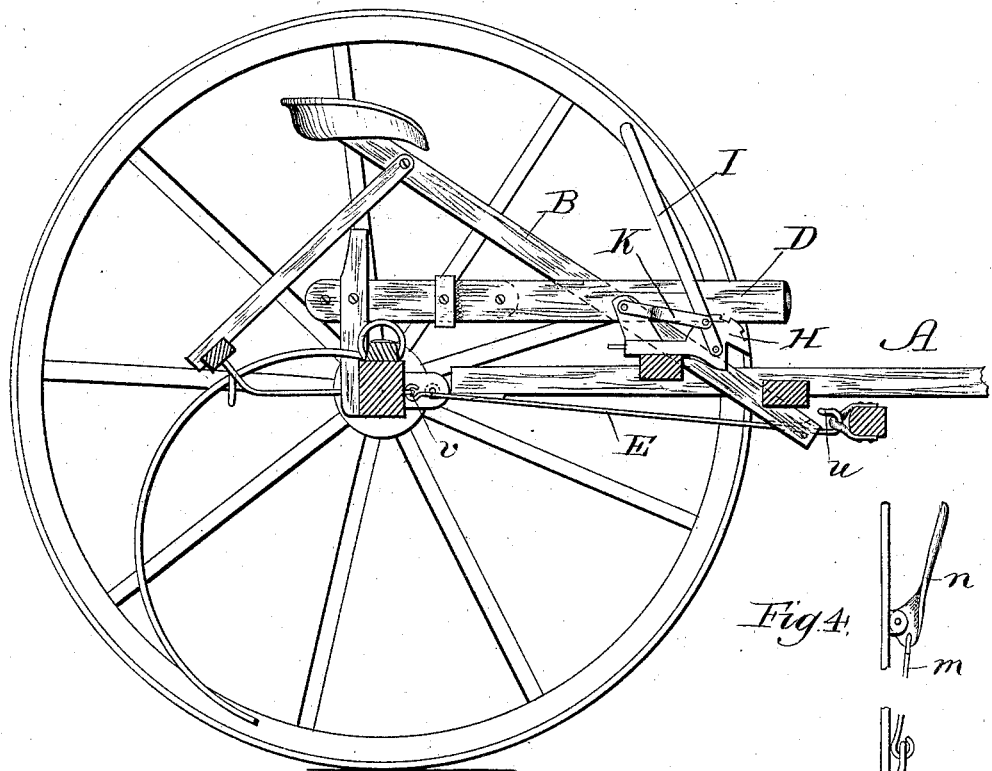
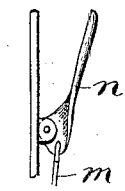
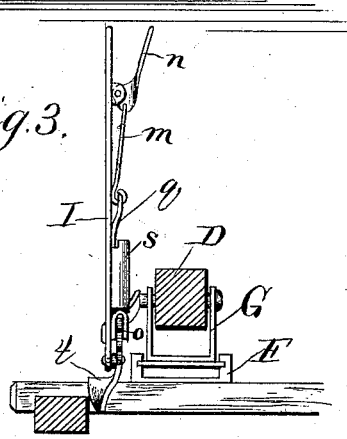

UNITED STATES PATENT OFFICE.

CYRUS A. WERDEN, OF WAUKEGAN, ILLINOIS, ASSIGNOR OF THREE-FOURTHS TO WILLIAM B. WERDEN, FRANCIS H. WERDEN, AND CLINTON A. WERDEN, ALL OF SAME PLACE.

HORSE HAY-RAKE.

SPECIFICATION forming part of Letters Patent No. 316,706, dated April 28, 1885.

Application filed January 16, 1884. (No model.)

*To all whom it may concern:*

Be it known that I, CYRUS A. WERDEN, a citizen of the United States, residing at Waukegan, in the county of Lake and State of Illinois, have invented certain new and useful Improvements in Horse Hay-Rakes; and I hereby declare the following to be a full, clear, and exact description of the same.

My invention relates to certain improvements upon the horse hay-rake for which Letters Patent of the United States, No. 249,811, were granted to me November 22, 1881. In that device the thills are hinged to the face of the axle carrying the rake-teeth about midway between its upper and lower edges, and with this construction is combined a pair of toggle-levers adapted to trip downward, whereby the throwing up of the rake for dumping a windrow, and also the returning of the rake to proximity with the ground, are effected wholly by the foot of the driver without any aid whatever from his hands, the dumping being accomplished (after breaking the toggle-joint by a slight pressure of the foot) solely by the weight of the driver upon the seat, and the returning of the rake-teeth to proximity with the ground being accomplished wholly by the exertion with the foot of sufficient pressure upon a lever to straighten the toggle-joint. With the same device is shown means for varying the distance of the rake-teeth from the ground when occasion requires. My present device involves this same construction; but my invention relates to certain additions whereby certain slight difficulties encountered in the use of the rake are completely overcome.

My present improvement is confined to the mechanism by which the rake-teeth are raised without complete dumping for the purpose of clearing stones and other obstructions, or for permitting their free passage over irregular surfaces. It often happens in the use of such a rake that the height of the teeth must be varied to suit different conditions. This is provided for in my former device by means of a hand-lever projecting vertically upward from the axle within reach of the driver, so that by taking hold of the lever and depressing the inner pedal projection of the toggle he may turn the axle sufficiently to avoid the obstruction, and at pleasure carry the rake-teeth back into position. It often happens, however, that it is desirable to maintain the rake-teeth in such raised position for a considerable time, in which case with my device as formerly constructed the driver must necessarily lose the use of one hand, and besides subject himself to no small degree of exertion. The position of the lever, moreover, behind the driver is somewhat inconvenient. These difficulties I overcome by providing a hand-lever toward one side and in front of the driver, by the backward or forward movement of which the axle may be rocked and the rake-teeth thus suitably raised or lowered, (not by breaking the toggle, as in my former device, but by sliding the toggle-lever backward or forward in its bearing, leaving the toggle straight,) and combining with such lever a spring-dog, whereby it may be secured at any desired angle. In this way the rake-teeth may be brought to any desired height by a quick pull or push upon the lever, and maintained there without the aid of the driver's hand, thus leaving him free to use both hands in driving.

My invention consists in the features above outlined, and also in certain details of construction and combinations of parts, all as hereinafter more fully set forth.

In the drawings, Figure 1 is a plan view of a horse hay-rake provided with my improvement; Fig. 2, a longitudinal section of the same near one of the thills; Fig. 3, a detail transverse section showing the lever and spring-dog, by means of which the height of the rake is regulated; and Fig. 4, a longitudinal section of the said lever enlarged.

A represents the thills, which are hinged to the face of the axle between the upper and lower edges thereof. B is the seat-bar, which is supported by a bar, C, passing across from one thill to the other, the latter forming the fulcrum for the foot-lever D, the construction and operation of which are fully described in my said former Letters Patent.

Instead of hooking the whiffletree to the lower end of the seat-bar B, as in my former device, whereby the draft was exerted through the medium of the thills, I now provide a central rod, E, hooked into a staple in the center of the face of the axle, as shown at $v$, or otherwise hinged or pivoted thereto at that point, and loosely supported near its forward end in the lower end of the seat-bar B. At its forward end it is hooked, as shown at $u$, for the connection of the whiffletree, though any other suitable connecting means may be substituted. The draft is exerted wholly through the medium of this rod.

A particular description of my mechanism for regulating the height of the rake-teeth is as follows: In my former device the toggle-lever D was pivoted to the cross-bar C by means of fixed bearings upon the latter. Thus it was impossible to turn the axle without tripping the toggle. I now pivot the said toggle-lever in a sliding bearing upon the cross-bar C, whereby the said toggle-lever may be moved forward and back through the medium of a hand-lever, thus turning the axle either way without tripping the toggle.

F is a flanged plate fixed to the cross-bar C, and serving as a guide in which the bearing G to which the toggle-lever D is pivoted slides.

Projecting from the outer flange of the guide-plate and firmly braced to the cross-bar C is a curved notched plate, H.

I is a lever pivoted at its lower end to the brace $t$, and connected above its pivotal point to the bearing G or toggle-lever D by a link, K, (for example, through the medium of the bolt pivoting the toggle-lever to the bearing, which bolt may be extended for this purpose, as shown in the drawings,) and having upon its inner face a lip or flange, $o$, extending over and down the opposite side of the notched plate H.

Upon the inner surface of the lever I, near its lower end, is a cylindrical case, $s$, inclosing a spring, $r$, and passing longitudinally through this case, close to the lever I, is a bar, $q$, provided with a shoulder, $p$, within the case and just below the spring. The bar C passes through a hole in the top of the flange $o$, and when forced to its lowest point by the spring extends far enough down to enter a notch in the plate H.

Fulcrumed to the inner face of the lever I is a small hand-lever, $n$, having its short arm connected to the upper end of the bar $q$ by a link, $m$. Thus the bar $q$ serves as a spring-dog to secure the lever I to the notched plate H. When it is desired to raise or lower the rake-teeth, the upper end of the lever I is grasped in the hand of the driver, the small hand-lever $n$ being pressed inward, thus freeing the spring-dog from the notched plate, and the lever moved forward or back, as circumstances shall require, thus sliding the toggle-lever D correspondingly forward or back in the guide-plate F, and easily rocking the axle, since the said toggle-lever is pivoted at its rear end to a bearing above the axle. When brought to the desired point, the lever is released, when the reaction of the spring $p$ carries the spring-dog down into the nearest notch of the notched plate, thus firmly securing it.

The spring-dog device with the lever I, above described, is common in agricultural machines for purposes analogous to that for which I employ it.

I have shown and described my improvement in connection with a horse hay-rake having the thills connected to the face of the axle, between the upper and lower edges thereof, since this is the situation in which I prefer to employ it; but it is obvious that it may also be used with advantage where the thills are connected to the upper or lower edge of the axle in the ordinary way, and the same remarks apply with reference to the central draft-rod.

What I claim as new, and desire to secure by Letters Patent, is—

1. In a horse hay-rake, the combination, with the rocking axle carrying rake-teeth, and with the thills hinged or pivoted to the axle and carrying the driver's seat, of the toggle-lever D, pivoted toward its rear end above the axle to a bearing projecting upward from the axle and pivoted toward its forward end in a sliding bearing upon a suitable support secured to the thills, and mechanism, substantially as described, for sliding the said forward bearing and toggle-lever back and forth and securing it at different points, as set forth.

2. In a horse hay-rake, the combination, with the rocking axle carrying rake-teeth, and with the thills hinged or pivoted to the axle and carrying the driver's seat, of the toggle-lever D, pivoted toward its rear end above the axle to a bearing projecting upward from the axle-bearing G, to which the toggle-lever D is pivoted toward its forward end, guide-plate F, fixed to a suitable support upon the thills in which the bearing G slides, curved notched plate H, fixed to a support on the thills, lever I, fulcrumed at its lower end to the said notched-plate, link K, connecting the lever I with the toggle-lever D, and spring-dog upon the lever I, operated by the hand for securing the said lever to the notched plate H, substantially as described.

CYRUS A. WERDEN.

In presence of—
D. W. ARNOLD,
F. W. HANZELRANCK.